(12) United States Patent
Krupka (10) Patent No.: US 7,561,644 B2
(45) Date of Patent: Jul. 14, 2009

(54) METHOD, SYSTEM AND DEVICE FOR REDUCING CO-CHANNEL INTERFERENCE

(75) Inventor: Eyal Krupka, Raanana (IL)

(73) Assignee: Intel Corporation, Santa Clara, CA (US)

( * ) Notice: Subject to any disclaimer, the term of this patent is extended or adjusted under 35 U.S.C. 154(b) by 760 days.

(21) Appl. No.: 11/237,832

(22) Filed: Sep. 29, 2005

(65) Prior Publication Data

US 2007/0070924 A1    Mar. 29, 2007

(51) Int. Cl.
H03D 1/04 (2006.01)
H03D 1/06 (2006.01)
H03K 5/01 (2006.01)
H03K 6/04 (2006.01)
H04B 1/10 (2006.01)
H04L 1/00 (2006.01)
H04L 25/08 (2006.01)

(52) U.S. Cl. ........................... 375/346; 375/316
(58) Field of Classification Search ................. 375/316, 375/322–324, 346, 347, 349, 377
See application file for complete search history.

(56) References Cited

U.S. PATENT DOCUMENTS 5,852,630 A * 12/1998 Langberg et al. ............ 375/219
6,173,014 B1 * 1/2001 Forssen et al. .............. 375/267
6,236,363 B1 * 5/2001 Robbins et al. ............. 342/360
6,292,135 B1 * 9/2001 Takatori et al. ............. 342/383
6,724,844 B1 * 4/2004 Ghosh ........................ 375/350
2003/0227410 A1 * 12/2003 Ferreol et al. .............. 342/420
2005/0101279 A1 * 5/2005 Lee et al. .................. 455/278.1

FOREIGN PATENT DOCUMENTS

EP    1 357 714    10/2003

OTHER PUBLICATIONS

Vidal, J.; Cabrera, M.; Agustin,. A.: "Space-time front-ends for Rake receivers in the FDD mode of UTRA", International Symposium on Image/Video Communications over Fixed and Mobile Networks, Apr. 17, 2000-Apr. 20, 2000, pp. 1-10, XP002414807.
Scott C Douglas et al: "Neural Networks for Blind Decorrelation of Signals", IEEE Transactions on Signal Processing, IEEE Service Center, New York, NY, US, vol. 45, No. 11, Nov. 1997, XP011057951; ISSN: 1053-587X.
International Search Report for Application No. PCT/US2006/037637 Date of completion of search Jan. 15, 2007.
Cochanel Interference Cancellation Within the Current GSM Standard Hafedh Trigui and Dirk T. M. Slock Institute EURECOM, France. 1998.

* cited by examiner

*Primary Examiner*—Shuwang Liu
*Assistant Examiner*—James M Perez
(74) *Attorney, Agent, or Firm*—Shiloh Peleg & Co./ Leason Ellis LLP (57) ABSTRACT

A device, system and method for applying a whitening transformation to a plurality of samples of a sampled symbol to reduce both temporal correlation between the sampled symbol and a pre-determined number of previous symbols, and a spatial correlation between a plurality of samples.

27 Claims, 5 Drawing Sheets

METHOD, SYSTEM AND DEVICE FOR REDUCING CO-CHANNEL INTERFERENCE

BACKGROUND OF THE INVENTION

In a wireless communication system, a first wireless communication station may transmit a first signal to a second wireless communication station. Co-channel interference may occur, for example, if a second signal (e.g., the "interference signal") is transmitted by for example a third wireless communication station, e.g., during the transmission of the first signal. Co-channel interference may result, for example, in errors in estimating a channel and/or a reduction in a probability of successfully decoding or processing a data block of the first signal.

Methods for channel interference cancellation are known in the art. Some interference cancellation methods, for example, methods implementing single antenna interference cancellation ("SAIC") algorithms, may not explicitly utilize information regarding the interference signal. Such methods are known as blind co-channel interference cancellation.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like. For example, "a plurality of mobile stations" may describe two or more mobile stations.

It should be understood that embodiments of the present invention may be used in a variety of applications. Although the present invention is not limited in this respect, the circuits and techniques disclosed herein may be used in many apparatuses such as receivers of a radio system. Receivers that may be used with embodiments of the present invention include, by way of example only, wireless local area network (WLAN) receivers, two-way radio receivers, digital system receivers, analog system receivers, cellular radiotelephone receivers and the like.

Types of cellular radiotelephone systems that may be used with embodiments of the present invention include, although are not limited to, Global System for Mobile communication (GSM) cellular radiotelephone, Time Division Multiple Access (TDMA), Extended-TDMA (E-TDMA), General Packet Radio Service (GPRS), Extended GPRS, and the like. Other types of networks and communications systems can be used with embodiments of the present invention.

The term "portable communication device", as used herein, may refer to, but is not limited to, a mobile station, a portable radiotelephone device, a cellular telephone, a cellular device, personal computer, Personal Digital Assistant (PDA), user equipment, and the like.

Some embodiments of the invention may be implemented, for example, using a machine-readable medium or article which may store an instruction or a set of instructions that, if executed by a machine (for example, by stations of wireless communication system, by a cellular telephone, and/or by other suitable machines), cause the machine to perform a method and/or operations in accordance with embodiments of the invention. Such machines may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of computer-readable memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Figure 1:
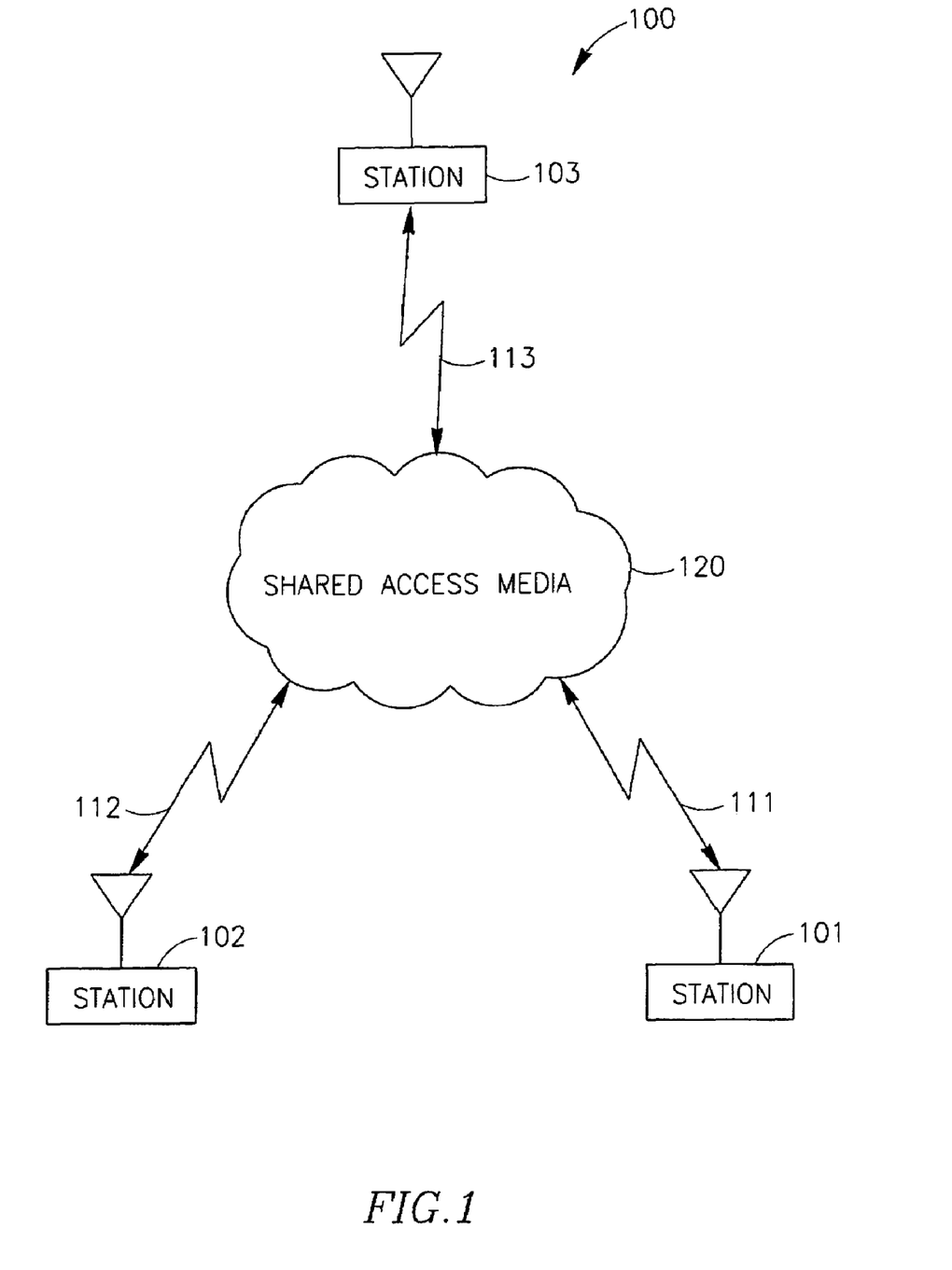
FIG. 1 is a schematic illustration of a wireless communication system including at least one communication station according to some demonstrative embodiments of the invention.

Reference is now made to FIG. 1, which schematically illustrates a wireless communication system 100 according to some embodiments of the invention.

System 100 may include one or more wireless communication stations, for example, wireless communications stations 101, 102 and 103. Other numbers of stations may be used.

Stations 101, 102 and/or 103 may communicate among themselves and with other devices over a shared wireless media 120, which may include, for example, wireless communication links 111, 112 and 113. For example, station 101 may communicate with one or more other stations of system 100 through link 111, station 102 may communicate with one or more other stations of system 100 through link 112, and/or station 103 may communicate with one or more other stations of system 100 through link 113.

Station 101 may transmit a first signal to station 103, e.g., during a first time period. Station 102 may transmit a second signal, for example, to station 103 and/or to any other station, e.g., during a second time period at least partially overlapping the first time period. The transmission of two or more signals during at least partially overlapping time periods may result in interference such as co-channel interference ("CCI"). Accordingly, a station in system 100, e.g., station 103, may receive a signal including a combination of the signal intended to be received by the station, e.g., the first signal, and the CCI.

According to some embodiments of the invention, one or more of stations 101, 102 and 103 may be able to estimate, detect, reduce and/or cancel the CCI relating to a received signal, e.g., as described in detail below. For example, station 103 may be able to detect, reduce and/or cancel the CCI or other interference relating to one or more signals, e.g., the first signal, received by station 103.

Figure 2:
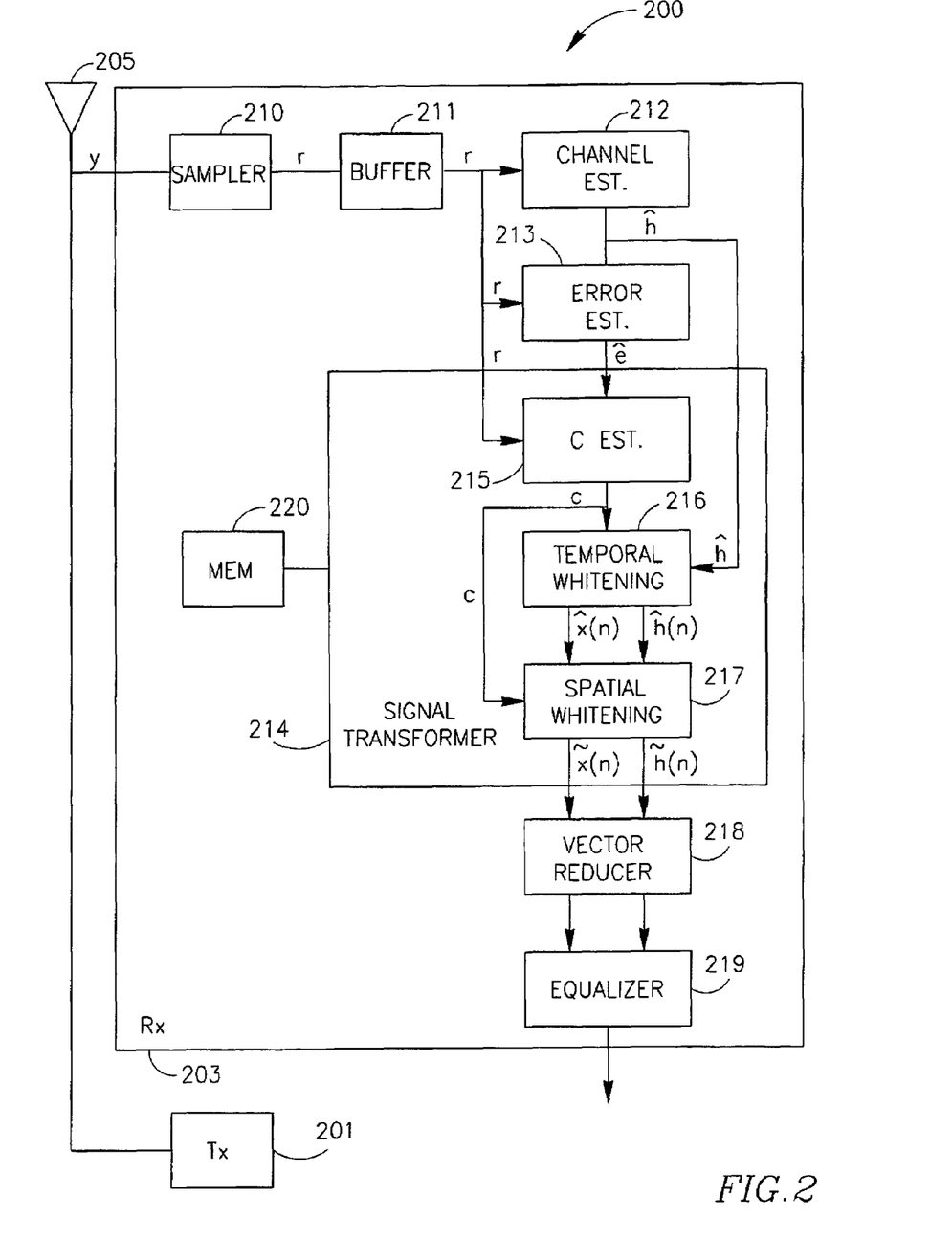
FIG. 2 is a block diagram of a communication station according to some embodiments of the invention.

Reference is now made to FIG. 2, which schematically illustrates a block diagram of a wireless communication station 200 according to some embodiments of the invention. Although the invention is not limited in this respect, station 200 may perform the functionality of station 103 (FIG. 1).

According to some embodiments of the invention, station 200 may include an antenna 205. Antenna 205 may include an internal and/or external radio frequency (RF) antenna. In some embodiments, for example, antenna 205 may include a dipole antenna, a monopole antenna, an omni-directional antenna, an end fed antenna, a circularly polarized antenna, a micro-strip antenna, a diversity antenna, or any other type of antenna suitable for sending and receiving wireless communication signals, blocks, frames, packets, messages and/or data.

Station 200 may optionally include a transmitter 201 to transmit wireless communication signals, blocks, frames, packets, messages and/or data, e.g., via antenna 205 as is known in the art.

Station 200 may also include a receiver 203. Receiver 203 may be able to receive a signal, denoted y, e.g., via antenna 205. The received signal y may be for example an analog complex signal and may include a combination of a signal intended to be received by communication station 200, and one or more interference signals, for example, CCI or interference from other noise sources like thermal noise, denoted e. Other types of signals may be used, and other types of interference may occur and be dealt with. Signal y, also referred to herein as a "slot", may represent a sequence of symbols or other information transmitted from a different communication station, e.g. station 101 (FIG. 1). Each slot may include for example a training sequence, a sequence of symbols known to the receiver which enables the receiver to gather information about the channel characteristics and a data sequence. Other or different data may be included.

According to some embodiments of the invention receiver 203 and/or transmitter 201 may be implemented, for example, using separate and/or integrated units, for example, using a transmitter-receiver or a transceiver, e.g., as is known in the art.

Receiver 203 may include a sampler 210 which may convert the analog received signal into digital signal, as in known in the art, and may sample the received signal y, for example, in a rate of R samples per symbol. Sampler 210 may be able to generate a sampled complex signal, denoted r, e.g., as is known in the art.

According to some embodiments of the invention, receiver 203 may include a buffer 220 which may temporarily store samples or portions of one or more slots received from sampler 210 which may be waiting to be sent to other components, blocks or units of receiver 203. For example, buffer 220 may store and output complex samples r(1), r(2), . . . r(n) wherein n=1-number of samples per slot.

The complex signal r may be represented as for example s vectors denoted by $r_1, r_2, \ldots r_s$ as follows:

$$r_d(n) = Re(r((n-1)R + (d+1)/2)) \text{ for odd } d$$

$$r_d(n) = Im(r((n-1)R + d/2)) \text{ for even } d \qquad [1]$$

Wherein s denotes the number of samples per symbol multiplied by 2 (for each sample there may be a real part and imaginary part), d=1−s and R denotes the number of samples per symbol at the receiver. For example for R=2

$r_1(1)$—denotes the first real sample of the first symbol.

$r_2(1)$—denotes the first imaginary sample of the first symbol.

$r_3(1)$—denotes the second real sample of the first symbol.

$r_4(1)$—denotes the second imaginary sample of the first symbol.

For each sample of r, a vector of s elements may be represented:

$$X(n) = \begin{bmatrix} r_1(n) \\ r_2(n) \\ \ldots \\ r_s(n) \end{bmatrix} \quad [2]$$

Furthermore, the preceding samples of $\underline{X}(n)$ may be represented as follows:

$$\underline{Y}(n) = \begin{bmatrix} \underline{X}(n-1) \\ \underline{X}(n-2) \\ \ldots \\ \underline{X}(n-\text{max\_delay}) \end{bmatrix} = \begin{bmatrix} r_1(n-1) \\ r_2(n-1) \\ \ldots \\ r_s(n-1) \\ r_1(n-2) \\ \ldots \\ r_s(n-\text{max\_delay}) \end{bmatrix} \quad [3]$$

Wherein n is the sample index and max_delay is a system parameter which may be chosen to improve performance and may determine the size of C.

Other formulas or representations may be used, and other parameters may be used. Station 200 may also include a channel estimator 212. Channel estimator 212 may be able to estimate, using for example the received vector r at the training sequence and the known transmitted symbols, the physical channel or the channel impulse response, denoted ĥ, and also referred to herein as the "channel estimation", e.g., as is known in the art. Channel estimator 212 may be implemented by software, by hardware, or by any combination of software and/or hardware as may be suitable for specific applications, and/or in accordance with specific design requirements, e.g., as are known in the art.

Station 200 may also include a noise estimator 213. Noise estimator 213 may be able to estimate, using the received vector r at the training sequence and the known transmitted symbols and the estimated channel, the estimated noise, or error, denoted ê, as is known in the art. Signal r may be represented for example as described as follows (other representations for formulae may be used):

$$r = h*T + e \quad [4]$$

Wherein T denotes the transmitted symbols at the transmitter side and * denotes convolution.

According to equation 4 noise estimator 213 may estimate the error or the noise according to the next equation for training sequence symbols:

$$\hat{e} = r - \hat{h}*T \quad [5]$$

The noise may be represented in accordance with the received signal r representation as follows:

$$\hat{e}_d = Re(\hat{e}((n-1)R + (d+1)/2)) \text{ for odd } d$$

$$\hat{e}_d = Im(\hat{e}((n-1)R + d/2)) \text{ for even } d \quad [6]$$

Noise estimator 213 may be implemented by software, by hardware, or by any combination of software and/or hardware as may be suitable for specific applications, and/or in accordance with specific design requirements, e.g., as are known in the art.

Station 200 may include a signal transformer 214 which may be able to apply for example a whitening transformation to signal r to reduce for example both temporal and spatial correlation, based on a covariance between samples of symbols of r as described in detail below. Other functions may be performed.

As with other modules, transformer 214 may be implemented, for example, by a processor, a central processing unit (CPU), possibly in conjunction with software, a digital signal processor (DSP), a microprocessor, a controller, a chip, a microchip, or any other suitable multi-purpose or specific processor.

According to some embodiments of the invention, signal transformer 214 may include a covariance estimator 215. Covariance estimator 215 may estimate the covariance matrix of the estimated noise related to the sampled symbols, denoted C, using the noise estimation ê. The elements of matrix C may be calculated according to for example the following formula (other formulae may be used):

$$C(is+k, js+l) = \frac{1}{b-a+1} \sum_{n=a}^{b} \hat{e}_k(n-j)\hat{e}_l(n-k) \quad [7]$$

Wherein a is the index of the first training sequence's sample, b is the index of the last training sequence's sample, i, j are integer indexes between 0 to maximum delay and k, l are integer indexes between 1 and s.

An illustration of the top 2*6 elements of covariance matrix C may be:

$$C = \begin{bmatrix} E[\hat{e}_1(n)\hat{e}_1(n)] & E[\hat{e}_1(n)\hat{e}_2(n)] & E[\hat{e}_1(n)\hat{e}_3(n)] & E[\hat{e}_1(n)\hat{e}_4(n)] & E[\hat{e}_1(n-1)\hat{e}_1(n)] & E[\hat{e}_1(n-1)\hat{e}_2(n)] & \cdots \\ E[\hat{e}_2(n)\hat{e}_1(n)] & E[\hat{e}_2(n)\hat{e}_2(n)] & E[\hat{e}_2(n)\hat{e}_3(n)] & E[\hat{e}_2(n)\hat{e}_4(n)] & E[\hat{e}_2(n-1)\hat{e}_1(n)] & E[\hat{e}_2(n-1)\hat{e}_2(n)] \end{bmatrix}$$

Wherein E[ ] denotes an expectation value. An empirical covariance between the elements may be used for estimation of the matrix elements. For example:

$$C(1, 1) = \frac{1}{b-a+1}\sum_{n=a}^{b} \hat{e}_1(n)\hat{e}_1(n) \quad [8]$$

$$C(1, 2) = \frac{1}{b-a+1}\sum_{n=a}^{b} \hat{e}_1(n)\hat{e}_2(n)$$

$$C(1, 5) = \frac{1}{b-a+1}\sum_{n=a}^{b} \hat{e}_1(n)\hat{e}_2(n-1)$$

$$C(5, 5) = \frac{1}{b-a+1}\sum_{n=a}^{b} \hat{e}_1(n-1)\hat{e}_1(n-1)$$

Another representation of matrix C may be:

$$C = \begin{bmatrix} C_{xx} & | & C_{xy} \\ - & - & - \\ C_{yx} & | & C_{yy} \end{bmatrix} \quad [9]$$

Wherein $C_{xx}$ denotes a s*s size matrix and $C_{yy}$ denotes a (s*max_delay)*(s*max_delay) size matrix.

According to some embodiments of the invention, signal transformer 214 may include a temporal whitening module 216. Temporal whitening module 216 may be able to apply a temporal whitening transformation to r to reduce temporal correlation between a sampled symbol of r and a predetermined number of previous symbols of r. Temporal whitening module 216 may receive for example both $\underline{X}(n)$ and $\underline{Y}(n)$ representing a slot, matrix C and channel estimation $\underline{\hat{h}}$.

Temporal whitening module 216 may apply the following equation on $\underline{X}(n)$ and $\underline{Y}(n)$ (other equations may be used):

$$\underline{\hat{X}}(n) = \underline{X}(n) - E[\underline{X}(n)|\underline{Y}(n)] \quad [10]$$

Wherein:

$$E[\underline{X}(n)|\underline{Y}(n)] = C_{xy}C_{yy}^{-1}\underline{Y}(n) \quad [11]$$

The result vector $\underline{\hat{X}}(n)$ may include samples of the n-th symbol with reduced correlation level to samples of the previous symbols.

Temporal whitening module 216 may apply the same transformation applied to the received signal (e.g., as described in equation 10) to the channel estimation $\underline{\hat{h}}$, in order to calculate the effect of the transformation (which is a linear transformation) on the channel estimation too. The result channel estimation is denoted $\underline{\hat{h}}(n)$. As with other formulae and calculations described herein, other suitable formulae and calculations may be used.

According to some embodiments of the invention, signal transformer 214 may include a spatial whitening module 217. Spatial whitening module 217 may be able to apply a spatial whitening transformation to $\underline{\hat{X}}(n)$ to reduce spatial correlation between samples of r's symbols. Spatial whitening module 217 may receive for example $\underline{\hat{X}}(n)$, matrix C and $\underline{\hat{h}}(n)$.

Spatial whitening module 217 may calculate matrix $C_{\hat{X}\hat{X}}$ for example as follows:

$$\begin{aligned} C_{\hat{X}\hat{X}} &= E(\hat{X}^T\hat{X}) \\ &= E((X - C_{xy}C_{yy}^{-1}Y)(X - C_{xy}C_{yy}^{-1}Y)^T) \\ &= E(XX^T) - 2E(C_{xy}C_{yy}^{-1}YX^T) + E(C_{xy}C_{yy}^{-1}YY^TC_{yy}^{-1}C_{xy}) \\ &= C_{xx} - 2C_{xy}C_{yy}^{-1}C_{yx} + C_{xy}C_{yy}^{-1}C_{yy}C_{yy}^{-1}C_{xy} \\ &= C_{xx} - C_{xy}C_{yy}^{-1}C_{yx} \end{aligned} \quad [12]$$

Spatial whitening module 217 may apply a spatial transformation on $\underline{\hat{X}}(n)$ as follows:

$$\underline{\tilde{X}}(n) = \sqrt{D^{-1}}V^T\underline{\hat{X}}(n) \quad [13]$$

Wherein D is a diagonal s*s eigenvalues matrix, and V is an s*s eigenvectors matrix of $C_{\hat{X}\hat{X}}$ and wherein $\sqrt{D^{-1}}V^T = \sqrt{C^{-1}}_{\hat{X}\hat{X}}$ which may be denoted as the "sphering" matrix.

As described in equations 12 and 13 spatial whitening module 217 may calculate the eigenvalues and eigenvectors of $C_{\hat{X}\hat{X}}$. Furthermore spatial whitening module 217 may calculate the projection of each sample of $\underline{\hat{X}}$ on the eigenvector and may divide it by square root of the eigenvalue such that the variance in this direction may equal 1. The result vector $\underline{\tilde{X}}(n)$ may include reduced correlation samples of the n-th symbol and may be represented by the following notation:

$$\underline{\tilde{X}}(n) = \begin{bmatrix} u_1(n) \\ u_2(n) \\ \ldots \\ u_s(n) \end{bmatrix} \quad [14]$$

Wherein each element $u_1, \ldots, u_s$ is a vector.

Other suitable representation may be used.

Spatial whitening module 217 may apply the same transformation applied to $\underline{\hat{X}}(n)$ (e.g., as described in equation 13) to $\underline{\hat{h}}(n)$ in order to calculate the effect of the transformation (which is a linear transformation) on the channel estimation. The result channel estimation may be denoted $\underline{\tilde{h}}(n)$ and may include vectors of channels ($\underline{\tilde{h}}_1, \ldots, \underline{\tilde{h}}_s$).

Figure 4:
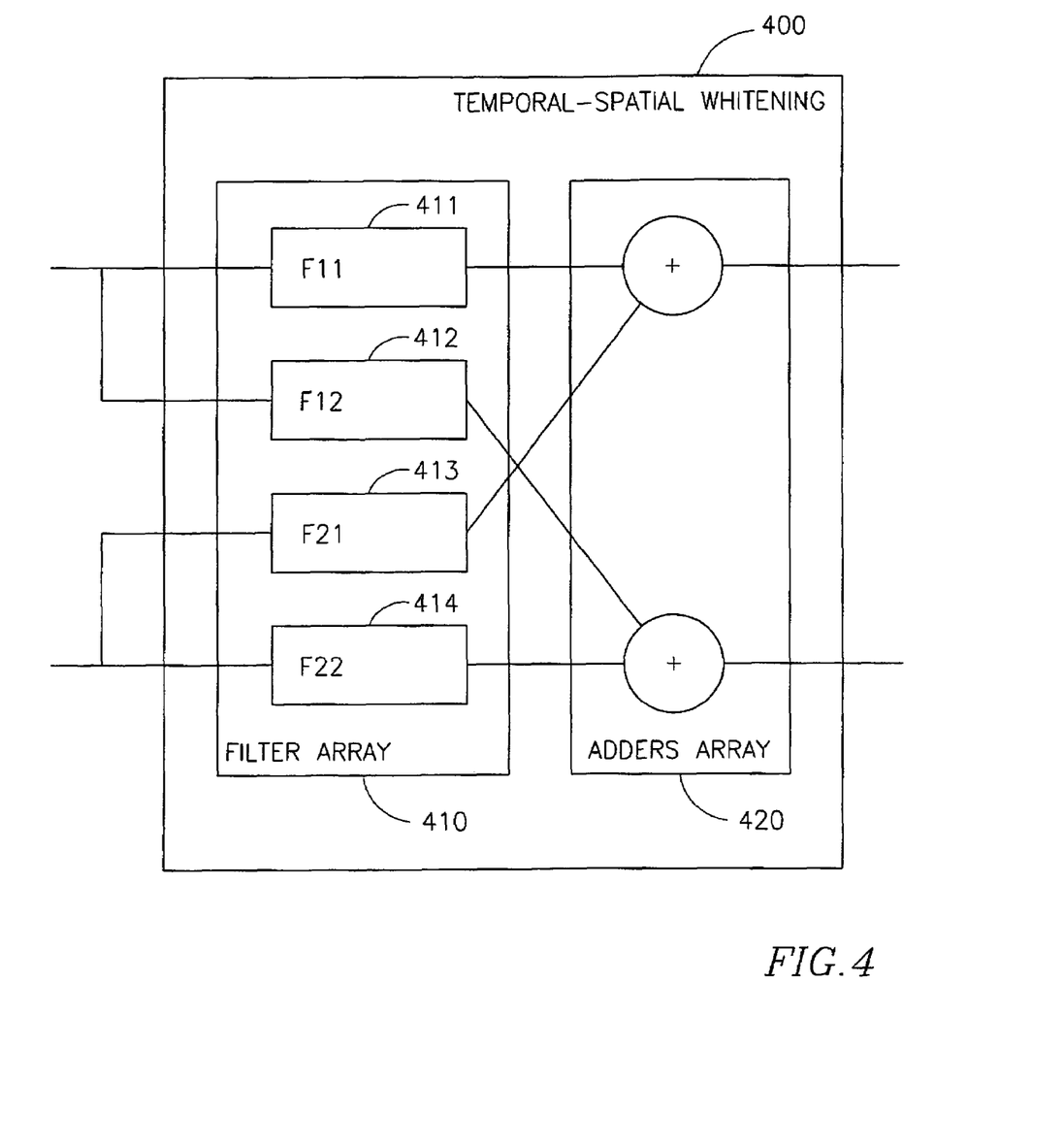
FIG. 4 is a block diagram of a temporal whitening and a spatial whitening module according to an embodiment of the invention.

In some embodiments of the invention temporal whitening module 216 and spatial whitening module 217 may be implemented as a single module applying for example the following equation and as further described in FIG. 4:

$$\underline{\tilde{X}}(n) = \sqrt{D^{-1}}V^T[I_{s*s} | -C_{xy}C_{yy}^{-1}]\begin{pmatrix} X(n) \\ X(n-1) \\ \ldots \\ X(n-\text{max\_delay}) \end{pmatrix} \quad [15]$$

Wherein $I_{s*s}$ denotes an s*s unit matrix.

The temporal whitening module 216 and spatial whitening module 217 may apply linear transformations which may be based for example on the theory that estimating the probability of a symbols sequence received may be equal to estimating the probability of the noise, e.g., the probability of the received signal minus the expected signal. In case of white noise the calculation may be as follows:

$$P(X_1 \ldots X_N) = P(X_1)P(X_2) \ldots P(X_n)$$

$$\log P(X_1 \ldots X_N) = \log P(X_1) + \log P(X_2) + \ldots + \log P(X_n) \qquad [12]$$

Wherein Xi may represent $\underline{X}(n)$ where n=i (e.g., each X element in equation 12 may represent a vectors of s samples of the n-th symbol).

In a non white noise calculation the calculation may be as follows:

$$P(X_1 \ldots X_N) = P(X_1)P(X_2|X_1)P(X_3|X_2,X_1)P(X_4|X_3,X_2,X_1) \ldots P(X_N|X_1 \ldots X_{N-1}) \cong \Pi P(X_n|X_{n-1}, \ldots, X_{n-max\_delay}) \qquad [13]$$

The calculation of equation 13 may be performed using temporal whitening module 216 and spatial whitening module 217, for example as described herein Some embodiments of the invention may include a spatial whitening module, e.g., spatial whitening module 217, a temporal whitening module e.g., temporal whitening module 216, and a covariance estimator, e.g., covariance estimator 215 being implemented as different elements of a transformer such as a signal transformer, e.g., signal transformer 214. However, it will be appreciated by those skilled in the art that other embodiments of the invention may include a covariance estimator and/or a temporal whitening module being implemented as part of a spatial whitening module, or in other manners. Further, the various calculations described herein, while described with certain embodiments as being performed by certain modules, may be performed by other sets of modules, with other names.

Station 200 may optionally include a vector reducer 218 and one or more equalizers 219. Vector reducer 218 may reduce s output vectors of $\underline{X}(n)$ into one or more $\underline{z}_i$ vectors according to the number and the type of equalizers 219 by applying a linear transformation as described in detail below in FIG. 3. For example, If equalizer 219 includes M real equalizers vector reducer 218 may reduce s vectors into $\underline{z}_i$ output vectors, wherein i=1–M, if equalizer 219 includes M complex equalizers vector reducer 218 may reduce s vectors into $\underline{z}_i$ output vectors wherein i=1–(M*2) output vectors.

Furthermore vector reducer 218 may apply the same linear transformation applied on $\underline{X}(n)$ on $\underline{\tilde{h}}(n)$ and may reduce the number of channel estimation vectors denoted $\underline{h}_i$ in accordance with the reduction of $\underline{X}(n)$ vectors.

According to some embodiments of the invention, station 200 may include an equalizer 219. Equalizer 219 may include one or more equalizers which may be able to remove distortion from vectors $\underline{z}_i$, to compensate for distortion of vectors $\underline{z}_i$ and/or to otherwise enhance and/or equalize vectors $\underline{z}_i$. For example, equalizer 219 may include suitable equalizing circuitry, e.g., as is known in the art. Equalizer 219 may also receive $\underline{h}_i$ from vector reducer 218. Furthermore equalizer 219 may include any suitable type of equalizers, for example, real equalizers or complex equalizers.

Some embodiments of the invention may include a signal transformer, e.g., signal transformer 214, an equalizer, e.g., equalizer 219, and a vector reducer, e.g., vector reducer 218 being implemented for example as different elements of a wireless communication station, e.g., station 200. However, it will be appreciated by those skilled in the art that other embodiments of the invention may include an equalizer and/or a vector reducer being implemented as part of a signal transformer.

Station 200 may include memory 220. Memory 220 may store for example estimations, instructions, parameters, values and/or data, which may be used and/or calculated in accordance with some embodiments of the invention. For example, memory 220 may store samples of signal r, transformed signals $\underline{\hat{X}}(n)$, matrix C elements and/or other elements which may be used for generating signals $\underline{X}(n)$ as described herein. Memory 220 may include, for example, a Random Access Memory (RAM), a Read Only Memory (ROM), a Dynamic RAM (DRAM), a Synchronous DRAM (SDRAM), a Flash memory, a volatile memory, a non-volatile memory, a cache memory, a buffer, a short term memory unit, a long term memory unit, or other suitable memory units or storage units.

Although the scope of the present invention is not limited in this respect, signal transformer 214, and/or vector reducer 218, and other modules discussed herein, may include or be included within an application specific integrated circuit (ASIC), a reduced instruction set circuit (RISC), a digital signal processor (DSP) or a central processing unit (CPU). Instructions to enable computing unit to perform methods of embodiments of the present invention may be stored in for example memory 220, as for example software, being executed by a processor or controller. Other modules may similarly be included within or include such circuits, or be embodied in such instructions.

Figure 3:
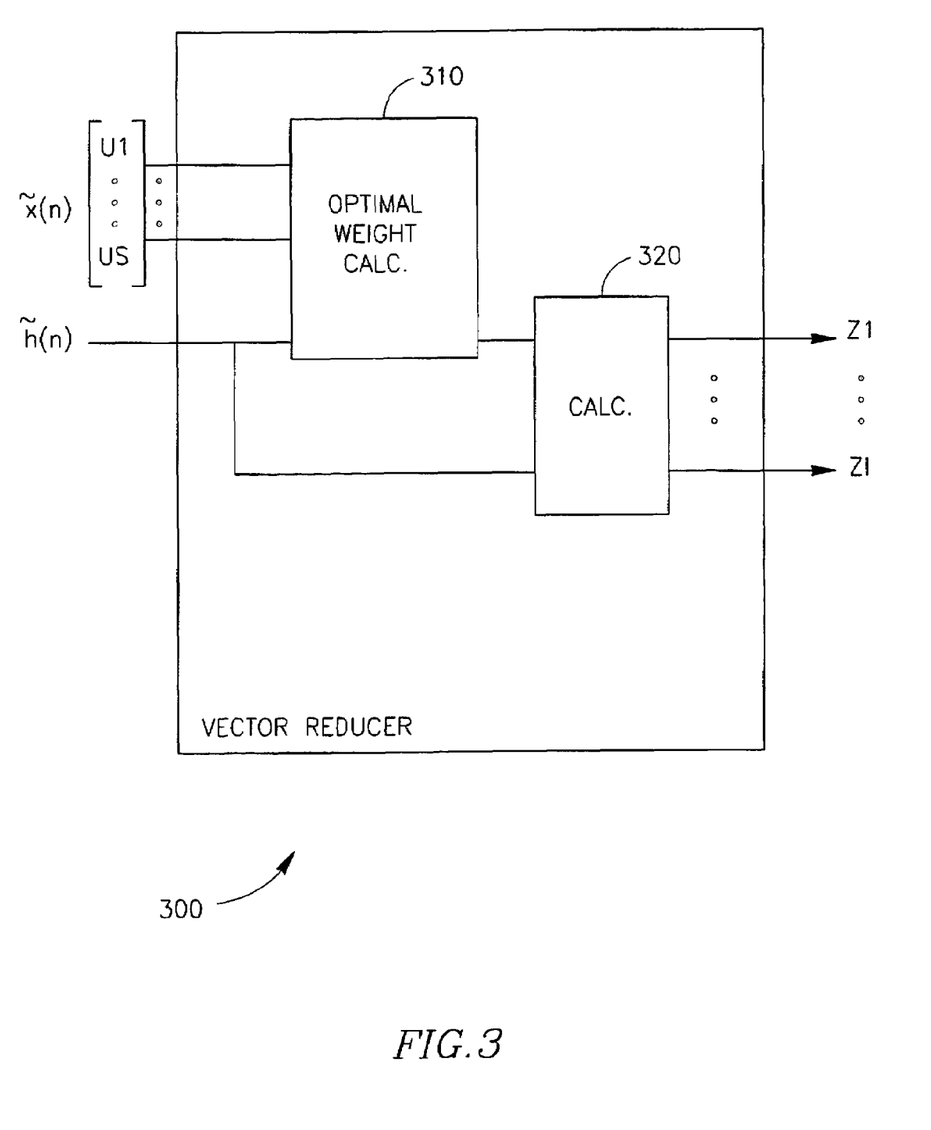
FIG. 3 is a block diagram of a vector reducing module according to some embodiments of the invention.

Reference is now made to FIG. 3, which schematically illustrates a block diagram of a vector reducer 300 according to some embodiments of the invention. Although the invention is not limited in this respect, vector reducer 300 may perform the functionality of vector reducer 218 (FIG. 2).

According to some embodiments of the invention, vector reducer 300 may be able to apply the following linear transformation (other transformations may be used):

$$z_i = \sum_{j=1}^{s} w_{ij} x_j \qquad [14]$$

Wherein i=1–(2*M), wherein w denotes a (s*(2*M)) matrix and $w_{ij}$ is the element (i,j) of the matrix W. For example, if equalizer 219 includes one complex equalizer the linear transformation of equation 14 may be:

$$z_1 = w_{11}\underline{u}_1 + w_{12}\underline{u}_2 + \ldots + w_{1s}\underline{u}_s$$

$$z_2 = w_{21}\underline{u}_1 + w_{22}\underline{u}_2 + \ldots + w_{2s}\underline{u}_s \qquad [15]$$

Wherein $u_1, u_2, \ldots, u_s$ are the elements of $\underline{X}(n)$ generated by signal transformer 214. If equalizer 219 includes one real equalizer, vector reducer 218 may generate one vector $\underline{r}_{eq}$ as follows:

$$\underline{r}_{eq} = \underline{z}_1 + j\underline{z}_2 \qquad [16]$$

Other suitable formulas may be used.

Vector reducer 300 may include an optimal weight calculator 310. Optimal weight calculator 310 may receive $\underline{X}(n)$ and $\underline{\tilde{h}}(n)$ and may be able to find and/or calculate the optimal values of matrix w elements as described further below. Optimal weight calculator 310 may use $\underline{\tilde{h}}(n)$, for example, received from spatial whitening module 217 and generate a L*s matrix $\underline{\tilde{H}}$, wherein L denotes the channel length e.g., the number of symbols per channel and wherein each column of $\underline{\tilde{H}}$ may be the estimated channel of different symbol sample, e.g., each column may be one of the vectors $\underline{\tilde{h}}_1, \ldots, \underline{\tilde{h}}_s$, those $\underline{\tilde{H}}$ may be represented as follows:

$$\underline{\tilde{H}} = [\underline{\tilde{h}}_1 \underline{\tilde{h}}_2 \ldots \underline{\tilde{h}}_s] \qquad [17]$$

Optimal weight calculator 310 may be able to calculate matrix G as follows:

$$G = \underline{H}^T \underline{H} \quad [18]$$

Wherein G may represent an s*s matrix.

Furthermore optimal weight calculator 310 may calculate the eigenvectors with the largest eigenvalues of matrix G and to generate matrix W, e.g., the rows of W may be the eigenvectors with the largest eigenvalues of matrix G.

According to some embodiments of the invention, the eigenvectors with the largest eigenvalues of matrix G may maximize output signals $z_i$. The eigenvectors with the largest eigenvalues of matrix G may be the optimal value for the linear transformation matrix w.

The equivalent channel at the output of the first symbol sample. E.g., as received from signal transformer 214 may be represented as follows:

$$\tilde{h}_{eq,1}(n) = \sum_d w_{1d} \tilde{H}(n+1, d) \quad [19]$$

Wherein $\tilde{H}(i,j)$ denotes the (i,j) element of matrix $\tilde{H}$.

The SNR which may result is for example:

$$SNR = \frac{\sum_n h_{eq,1}^2(n)}{\sum_d w_{1d}^2} \quad [20]$$

The SNR may be maximized if $|H_{eq}|^2$ may be maximized subject to constraint $$\sum_d W_d^2 = 1.$$

According to some embodiments of the invention, optimal weight calculator 318 may be able to find maximum value of the following expression denoted by Q by deriving, for example, by using lagrange multiplier, for example:

$$Q = \frac{1}{2} \sum_n \left( \sum_d W_d H(n+1, d) \right)^2 + \frac{1}{2} \lambda_1 \left( \sum_d W_d^2 - 1 \right) \quad [21]$$

$$\frac{dQ}{d\underline{W}} = (H^T H)\underline{W} - \lambda_1 \underline{W} = 0$$

Wherein $\underline{W}_1$ denotes the first row of matrix W. $\underline{W}_1$ may denote the eigenvectors of G and the SNR may be the value of the eigenvalue corresponds to the selected eigenvector.

The eigenvectors of matrix G may be orthogonal, and optimal weight calculator 310 may use for example the eigenvectors of G with the highest eigenvalues as the W elements.

According to some embodiments of the invention, vectors reducer 306 may include calculator 320. Calculator 320 may include plurality of multipliers and/or adders which may be able to multiply the optimal weights $w_{ij}$ by the corresponding signals $\underline{u}_j$ and to add the multipliers sum (as described in equation set 14). For example for calculating $\underline{z}_1 = w_{11}\underline{u}_1 + w_{12}\underline{u}_2 + \ldots w_{1s}\underline{u}_s$ multipliers and s adders may be used. Any other number of multipliers and adders may be used and any other mathematical components may be used.

Calculator 320 may optionally include additional adders to create real vectors from complex vectors. (as described in equation 16)

Reference is now made to FIG. 4, which is a block diagram of a temporal whitening module and spatial whitening module according to an embodiment of the invention.

Although the invention is not limited in this respect, a temporal whitening module, e.g. temporal whitening module 214 of FIG. 2 and a spatial whitening module, e.g., spatial whitening module 217 of FIG. 2 may be implemented as one temporal-spatial module 400 which may be able to may be able to apply both a temporal whitening transformation to r to reduce temporal correlation between a sampled symbol of r and a predetermined number of previous symbols of r and a spatial whitening transformation to reduce spatial correlation between samples of r symbols. Temporal-spatial module 400 may calculate the following equation:

$$\tilde{X}(n) = \sqrt{D^{-1}} V^T [I_{s*s} | -C_{xy} C_{yy}^{-1}] \begin{pmatrix} X(n) \\ X(n-1) \\ \ldots \\ X(n - \text{max\_delay}) \end{pmatrix} \quad [22]$$

An equivalent representation of equation 22 may be for example:

$$\tilde{X}(n) = \sqrt{D^{-1}} V^T [I_{s*s} | -C_{xy} C_{yy}^{-1}] \begin{pmatrix} r_1(n) \\ r_2(n) \\ \ldots \\ r_s(n) \\ r_1(n-1) \\ r_2(n-1) \\ \ldots \\ r_s(n-1) \\ r_1(n - \text{max\_delay}) \\ r_2(n - \text{max\_delay}) \\ \ldots \\ r_s(n - \text{max\_delay}) \end{pmatrix} \quad [23]$$

FIG. 4 illustrates an embodiment of the invention where for example, a complex signal sampled at a rate of one sample per symbol may be related to the input signal r such that s=2 and max_delay may also be 2.

According to an illustrative embodiment of the invention, temporal-spatial module 400 may receive $\underline{X}(n)$, matrix C and channel estimation $\tilde{h}$. Furthermore, tempo-spatial module 400 may include a filter arrangement 410. Filter arrangement 410 may be able to perform equation 23 by for example, four linear filters: filter F11 411, filter F12 412, filter F21 413 and filter F22 414.

According to some embodiments of the invention, filters 411-414 may apply the for example following expression:

$$\sqrt{D^{-1}} V^T [I_{s*s} | -C_{xy} C_{yy}^{-1}] \quad [24]$$

on $\underline{X}(n)$ and $\tilde{h}$. In some embodiments of the invention, filter F11 411 may apply the first element of the expression, filter F12 412 may apply the second element of the expression, filter F21 413 may apply the third element of the expression and filter F22 414 may apply the fourth element of the expression. For example if s=2 the expression 24 may be a 2*6 matrix and each filter 411-414 may include 3 elements of this matrix, e.g., each filter 411-414 may be a 1*3 vector.

According to some embodiments of the invention, temporal-spatial module 400 may include an adder array 420 which may be able to add vectors generated by filter arrangement 410.

Although the scope of the present invention is not limited in this respect interference reducer 600 may generate estimated channel $\tilde{h}(n)$ by applying linear filters 411-414 on estimated channel $\tilde{h}$.

Figure 5:
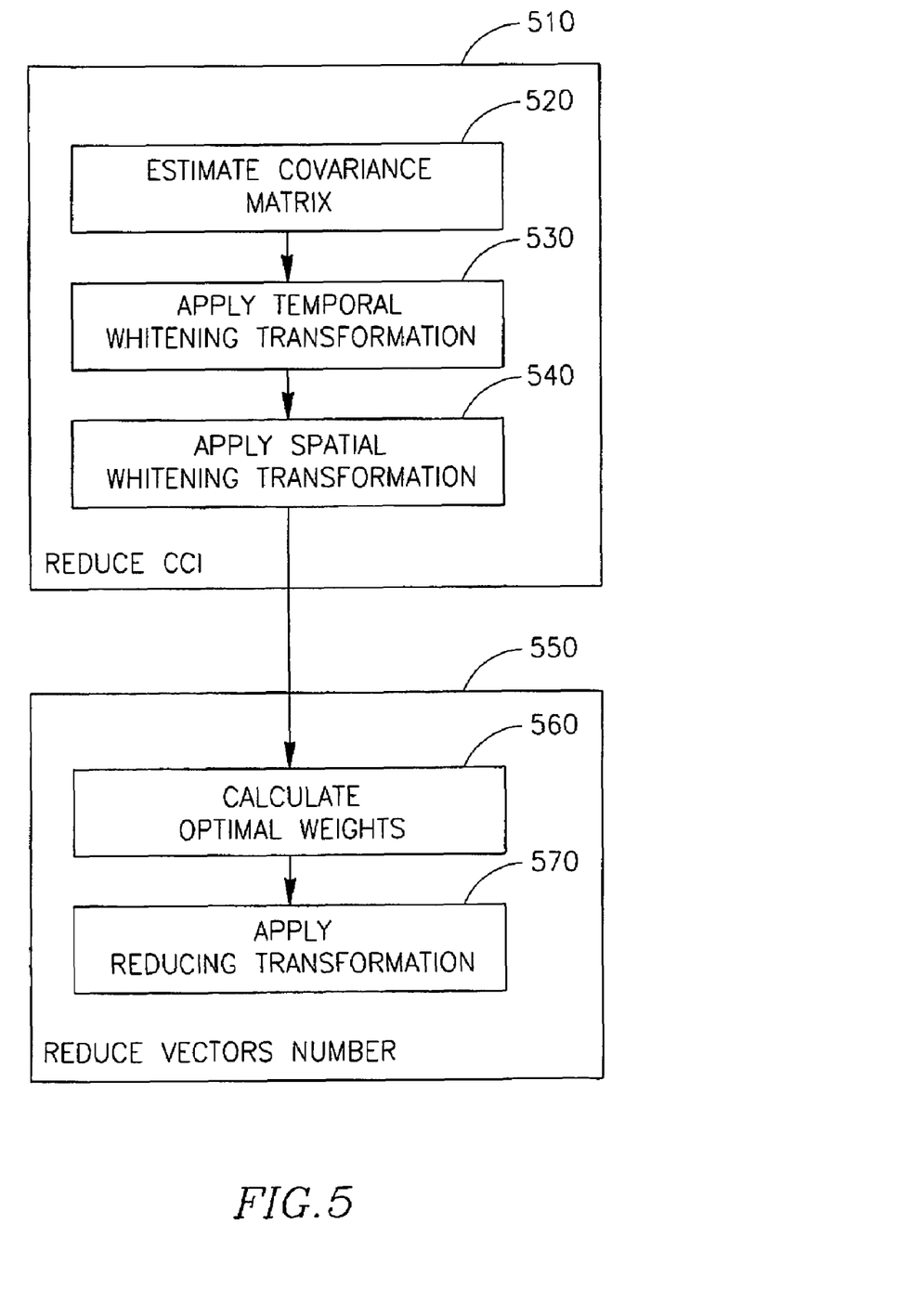
FIG. 5 is a flow-chart illustration of a method of reducing co-channel interference according to some embodiments of the invention.

Reference is now made to FIG. 5, which schematically illustrates a method for reducing CCI or other interference according to some embodiments of the invention.

As indicated at block 510 an embodiment of the invention may include reducing CCI of a received signal by applying a temporal and spatial transformation on received signal. Reducing CCI may include, for example, using a signal transformer, e.g., signal transformer 214 as described herein with reference to FIG. 2.

As indicated at block 520 an embodiment of the invention may include estimating the covariance matrix of the estimated noise related to the sampled symbols of the received training sequence. Generating the covariance matrix may include, for example, using a covariance estimator, e.g., covariance estimator 215 as described herein with reference to FIG. 2.

As indicated in block 530 an embodiment of the invention may include applying a temporal whitening transformation to the received signal to reduce temporal correlation between a sampled symbol of the received signal and a predetermined number of previous symbols of the received signal. Furthermore an embodiment of the invention may include applying the temporal whitening transformation to the channel estimation. Applying the temporal whitening transformation may include using the covariance matrix. Generating the reduced temporal correlation between samples of received signal's symbols and samples of the previous received signal's symbols may include, for example, using a temporal whitening module, e.g., temporal whitening module 216 as described herein with reference to FIG. 2.

As indicated in block 540 an embodiment of the invention may include applying a spatial whitening transformation to the reduced temporal correlation signal to reduce spatial correlation between samples of the received signal's symbols. Furthermore an embodiment of the invention may include applying the spatial whitening transformation to the reduced temporal correlation channel estimation. Applying the spatial whitening transformation may include using the covariance matrix. Generating the reduced spatial correlation between samples of the received signal's symbols may include, for example, using a spatial whitening module, e.g., spatial whitening module 217 as described herein with reference to FIG. 2.

As indicated in block 550 an embodiment of the invention may include reducing any number of vectors into one or more vectors by applying a reducing transformation. Reducing the vector number may include, for example, using a vector reducer module, e.g., vector reducer module 218 as described herein with reference to FIG. 2.

As indicated in block 560 the optimal weights of the reducing transformation may be calculated. Such weights may be, for example, elements of a calculated matrix. An embodiment of the invention may include using an estimated channel matrix which may include the estimated channel of different symbol sample. For example, each column of the estimated channel matrix may be a channel of different symbol sample.

The product of the estimated channel matrix multiplied by the transpose estimated channel matrix may be generated and the optimal weights may be calculated (such weights may be the eigenvectors with the largest eigenvalues of this matrix). Calculating the optimal weights of the reducing transformation may include, for example, using an optimal weight calculator module, e.g., optimal weight calculator module 310 as described herein with reference to FIG. 3.

As indicated in block 570 a reducing linear transformation for reducing the number of vectors may be applied. An embodiment of the invention may include multiplying the calculated optimal weights by the input vectors. Applying the reducing linear transformation may include, for example, using calculator module, e.g., calculator module 320 as described herein with reference to FIG. 3.

Other operations or series of operations may be used.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method of handling wireless communication signals received by a wireless communication device, the method comprising:
   sampling a wireless communication signal received via a wireless communication antenna to generate a plurality of samples per symbol;
   determining a covariance matrix corresponding to a sampled symbol, wherein the covariance matrix includes a first plurality of correlations between estimated noise relating to samples of the symbol, a second plurality of correlations between the estimated noise relating to the samples of the symbol and estimated noise relating to samples of a predefined number of previous symbols received via the antenna, and a third plurality of correlations between estimated noise relating to the samples of the previous symbols; and
   applying to the samples of the symbol a whitening transformation, which is based on the covariance matrix, to reduce both a temporal correlation between the sampled symbol and samples of the previous symbols, and a spatial correlation between the samples of the symbol.

2. The method of claim 1, wherein determining the covariance matrix comprises determining the covariance matrix based on estimated noise samples related to samples of a training sequence, and wherein the covariance matrix includes a first sub-matrix representing the first plurality of correlations, second and third sub-matrices representing the second plurality of correlations, and a fourth sub-matrix representing the third plurality of correlations.

3. The method of claim 1, wherein applying the whitening transformation comprises:
   applying to the samples of the symbol a temporal whitening transformation, which is based on the covariance matrix, to determine transformed samples having reduced correlation with the samples of the previous symbols; and
   applying to the transformed samples a spatial whitening transformation, which is based on the covariance matrix, to reduce the correlation between the transformed samples.

4. The method of claim 3, wherein applying the temporal whitening transformation comprises subtracting from the samples of the symbol a conditional expectation of the samples of the symbol given the samples of the previous symbols.

5. The method of claim 4, comprising determining the conditional expectation based on the second and third pluralities of correlations.

6. The method of claim 3, wherein applying the spatial whitening transformation comprises multiplying the transformed samples by a sphering matrix, which is based on the covariance matrix.

7. The method of claim 6, wherein the sphering matrix is based on one or more eigenvalues and one or more eigenvectors of the covariance matrix.

8. The method of claim 6, wherein applying the spatial whitening transformation to the transformed samples includes dividing a projection of each transformed sample on an eigenvector of the covariance matrix by a square root of an eigenvalue of the covariance matrix.

9. The method of claim 1, wherein applying the whitening transformation results in a plurality of vectors corresponding to the plurality of samples, respectively, the method comprising transforming the plurality of vectors into a reduced number of transformed vectors by applying to the plurality of vectors a linear transformation based on a plurality of calculated weights.

10. The method of claim 9, wherein applying the linear transformation comprises calculating a weighted sum of the vectors multiplied by the weights.

11. The method of claim 9, comprising applying the whitening transformation to a channel estimation to determine a transformed channel estimation, determining a matrix based on the transformed channel estimation, and determining the weights based on the largest eigenvalues of the determined matrix.

12. The method of claim 11, wherein determining the weights includes determining the weights to include eigenvectors with the largest eigenvalues of the determined matrix.

13. A wireless communication apparatus comprising:
a sampler to sample a wireless communication signal received via a wireless communication antenna to generate a plurality of samples per symbol; and
a transformer to determine a covariance matrix corresponding to a sampled symbol, wherein the covariance matrix includes a first plurality of correlations between estimated noise relating to samples of the symbol, a second plurality of correlations between the estimated noise relating to the samples of the symbol and estimated noise relating to samples of a predefined number of previous symbols received via the antenna, and a third plurality of correlations between estimated noise relating to the samples of the previous symbols, and to apply to the samples of the symbol a whitening transformation, which is based on the covariance matrix, to reduce both a temporal correlation between the sampled symbol and samples of the previous symbols and a spatial correlation between a the samples of the symbol.

14. The apparatus of claim 13, wherein the transformer is to estimate the covariance matrix based on estimated noise samples related to samples of a training sequence, and wherein the covariance matrix includes a first sub-matrix representing the first plurality of correlations, second and third sub-matrices representing the second plurality of correlations, and a fourth sub-matrix representing the third plurality of correlations.

15. The apparatus of claim 13, wherein the transformer comprises:

a temporal whitening nodule to apply to the samples of the symbol a temporal whitening transformation, which is based on the covariance matrix, to determine transformed samples having reduced correlation with the samples of the previous symbols; and
a spatial whitening module to apply to the transformed samples a spatial whitening transformation, which is based on the covariance matrix, to reduce the correlation between the transformed samples.

16. The apparatus of claim 15, wherein the temporal whitening module is to subtract from the samples of the symbol a conditional expectation of samples of the symbol given the samples of the previous symbols.

17. The apparatus of claim 16, wherein the temporal whitening module is to determine the conditional expectation based on the second and third pluralities of correlations.

18. The apparatus of claim 15, wherein the spatial whitening module is to multiply the transformed samples by a sphering matrix, which is based on the covariance matrix.

19. The apparatus of claim 18, wherein the sphering matrix is based on one or more eigenvalues and one or more eigenvectors of the covariance matrix.

20. The apparatus of claim 18, wherein the spatial whitening module is to divide a projection of each transformed sample on an eigenvector of the covariance matrix by a square root of an eigenvalue of the covariance matrix.

21. The apparatus of claim 13, wherein the transformed is to generate a plurality of vectors corresponding to the plurality of samples, respectively, the apparatus comprising a vector reducer to transform the plurality of vectors into a reduced number of transformed vectors by applying to the plurality of vectors a linear transformation based on a plurality of calculated weights.

22. The apparatus of claim 21, wherein the vector reducer is to calculate a weighted sum of the vectors multiplied by the weights.

23. The apparatus of claim 21, wherein the transformer is to apply the whitening transformation to a channel estimation to determine a transformed channel estimation, and wherein the vector reducer is to determine a matrix based on the transformed channel estimation, and to determine the weights based on the largest eigenvalues of the determined matrix.

24. The apparatus of claim 23, wherein the vector reducer is to determine the weights to include eigenvectors with the largest eigenvalues of the determined matrix.

25. A communication system comprising:
a station comprising:
a dipole antenna to receive a signal;
a sampler to sample the signal to generate a plurality of samples per symbol; and
a transformer to determine a covariance matrix corresponding to a sampled symbol, wherein the covariance matrix includes a first plurality of correlations between estimated noise relating to samples of the symbol, a second plurality of correlations between the estimated noise relating to the samples of the symbol and estimated noise relating to samples of a predefined number of previous symbols received via the antenna, and a third plurality of correlations between estimated noise relating to the samples of the previous symbols, and to apply to the samples of the symbol a whitening transformation, which is based on the covariance matrix, to reduce both a temporal correlation between the sampled symbol and samples of the previous symbols and a spatial correlation between the samples of the symbol.

26. The communication system of claim 25, wherein the transformer is to estimate the covariance matrix based on estimated noise samples related to samples of a training sequence, and wherein the covariance matrix includes a first sub-matrix representing the first plurality of correlations, second and third sub-matrices representing the second plurality of correlations, and a fourth sub-matrix representing the third plurality of correlations.

27. The communication system of claim 25, wherein the transformer comprises:

a temporal whitening nodule to apply to the samples of the symbol a temporal whitening transformation, which is based on the covariance matrix, to determine transformed samples having reduced correlation with the samples of the previous symbols; and a spatial whitening module to apply to the transformed samples a spatial whitening transformation, which is based on the covariance matrix, to reduce the correlation between the transformed samples.

* * * * *

UNITED STATES PATENT AND TRADEMARK OFFICE
CERTIFICATE OF CORRECTION

PATENT NO. : 7,561,644 B2
APPLICATION NO. : 11/237832
DATED : July 14, 2009
INVENTOR(S) : Eyal Krupka Page 1 of 1

It is certified that error appears in the above-identified patent and that said Letters Patent is hereby corrected as shown below:

In column 15, line 57, in Claim 13, after "between" delete "a".

In column 16, line 1, in Claim 15, delete "nodule" and insert -- module --, therefor.

In column 18, line 1, in Claim 27, delete "nodule" and insert -- module --, therefor.

Signed and Sealed this

Sixth Day of October, 2009

David J. Kappos
*Director of the United States Patent and Trademark Office*